(12) United States Patent
Espiard et al.

(10) Patent No.: US 6,297,316 B1
(45) Date of Patent: *Oct. 2, 2001

(54) BIPOPULATED LATEX OF POLYMERS BASED ON VINYL CHLORIDE, PROCESSES FOR THE PRODUCTION THEREOF AND APPLICATION THEREOF IN PLASTISOLS EXHIBITING IMPROVED RHEOLOGY

(75) Inventors: Philippe Espiard, Liancourt; Richard Peres, Saint Auban sur Durance; Benoit Ernst, Beaumont-le-Rocher, all of (FR)

(73) Assignee: Elf Atochem S.A. (FR)

( * ) Notice: Subject to any disclaimer, the term of this patent is extended or adjusted under 35 U.S.C. 154(b) by 0 days.

This patent is subject to a terminal disclaimer.

(21) Appl. No.: 08/917,897

(22) Filed: Aug. 27, 1997

(30) Foreign Application Priority Data

Aug. 27, 1996 (FR) .................................................. 96 10493

(51) Int. Cl.⁷ ................................ C08J 5/41; C08J 35/00
(52) U.S. Cl. ............................ 524/745; 524/834; 526/75
(58) Field of Search ..................................... 524/834, 745; 526/75

(56) References Cited

U.S. PATENT DOCUMENTS

| 4,245,070 | * | 1/1981 | Kemp | 526/75 |
| 4,461,869 | * | 7/1984 | Yang | 525/80 |
| 5,151,476 | | 9/1992 | Marshall et al. | 526/93 |
| 5,300,551 | * | 4/1994 | Candries et al. | 524/458 |

FOREIGN PATENT DOCUMENTS

| 0 025 561 | 3/1981 | (EP) . |
| 0 270 436 | 6/1988 | (EP) . |
| 1318956 | 5/1963 | (FR) . |
| 2 286 152 | 3/1976 | (FR) . |
| 2 309 569 | 11/1976 | (FR) . |
| 2 344 579 | 10/1977 | (FR) . |

* cited by examiner

Primary Examiner—Peter D. Mulcahy
(74) Attorney, Agent, or Firm—Millen, White, Zelano & Branigan, P.C.

(57) ABSTRACT

The present invention relates to a latex containing two populations of particles of polymers based on vinyl chloride. Other subjects of the present invention are processes for producing this latex and its use in the manufacture of fluid plastisols which are stable on storage.

10 Claims, No Drawings

BIPOPULATED LATEX OF POLYMERS BASED ON VINYL CHLORIDE, PROCESSES FOR THE PRODUCTION THEREOF AND APPLICATION THEREOF IN PLASTISOLS EXHIBITING IMPROVED RHEOLOGY

The present invention relates to a latex containing two populations of particles of polymers based on vinyl chloride. Other aims of the present invention are processes for producing this latex and its use in the manufacture of fluid plastisols which are stable on storage.

Bipopulated latices of particles of polymers based on vinyl chloride, respectively exhibiting mean diameters of between 0.4 and 2.5 μm and between 0.08 and 1 μm, in a ratio of the diameters of between 1 and 20 and a ratio by weight of between 0.1 and 10, are known (FR 2 309 569). In the examples which illustrate the invention, these latices are prepared by seeded microsuspension polymerization in the presence of a first seeding polymer, the particles of which contain at least one organosoluble initiator and have a mean diameter of at most 0.48 μm.

Moreover, a process for producing a latex of polymers based on vinyl chloride, capable of giving fluid plastisols which are stable on storage, is described in Patent JP-A-6 107 711. This process is characterized in that the seeded microsuspension polymerization is carried out in the presence of a specific surface-active agent, such as, for example, nonylpropenylphenol (ethylene oxide)$_{20}$.

Plastisols comprising polymers based on vinyl chloride having a low viscosity and exhibiting good stability on storage are much sought after. They have numerous applications in coating and in the manufacture of moulded articles. Their low viscosity makes them easier to use and also makes it possible to increase the productivity during conversion.

The Applicant Company has now discovered a latex containing two populations of particles of polymers based on vinyl chloride, respectively exhibiting mean diameters of between 1.2 and 2 μm and between 0.15 and 0.30 μm, in proportions such that the ratio by weight of the population with the lesser mean diameter to that with the greater mean diameter is between 0.1 and 0.3. The powder resulting from the atomization of this latex, optionally followed by milling, is very particularly suitable for the manufacture of fluid plastisols which are stable on storage.

Polymers based on vinyl chloride is understood to mean homo- and copolymers, the latter containing at least 50% by weight of vinyl chloride and at least one monomer which is capable of copolymerizing with vinyl chloride. The copolymerizable monomers are those generally employed in conventional techniques for the copolymerization of vinyl chloride. Mention may be made of vinyl esters of mono- and polycarboxylic acids, such as vinyl acetate, propionate or benzoate; unsaturated mono- and polycarboxylic acids, such as acrylic, methacrylic, maleic, fumaric and itaconic acids, and their aliphatic, cycloaliphatic or aromatic esters, their amides or their nitriles; alkyl, vinyl or vinylidene halides; alkyl vinyl ethers and olefins.

The preferred polymers based on vinyl chloride are vinyl chloride homopolymers.

The latex according to the present invention can be obtained by seeded microsuspension polymerization of the corresponding monomer or monomers in the presence of a first seeding polymer (P1), the particles of which contain at least one organosoluble initiator, of a second seeding polymer (P2), the particles of which have a mean diameter less than that of the particles of the first seeding polymer (P1), of water, of an anionic emulsifier, of a soluble metal salt and of a reducing agent.

This process is characterized in that the mean diameter of the particles of the first seeding polymer (P1) is between 0.6 and 0.9 μm.

The first seeding polymer (P1) necessary for the polymerization can be prepared according to conventional microsuspension polymerization techniques, such as that described in Patent FR 2 309 569, but the time for dispersion of the monomer or monomers is less than that commonly used. It is then used in the form of an aqueous dispersion of its particles.

The organosoluble initiators to be employed in the preparation of the first seeding polymer (P1) are represented by organic peroxides, such as lauroyl, decanoyl and caproyl peroxides, tert-butyl diethylperacetate, diethylhexyl percarbonate, diacetyl peroxide and dicetyl peroxide carbonate.

Lauroyl peroxide is advantageously chosen.

In the case where a number of organosoluble initiators are employed, it is advantageous to choose them with different reactivities; the most reactive initiators act mainly during the preparation of the seeding polymer, whereas the least reactive initiators act in particular during the seeded polymerization.

The second seeding polymer (P2) is provided in the form of an aqueous dispersion of its particles, the mean diameter of which is preferably between 0.1 and 0.14 μm.

This particle dispersion can be obtained by conventional microsuspension or emulsion polymerization techniques.

When the second seeding (P2) is prepared by microsuspension polymerization, the preparation is carried out as described above but the homogenization is more developed.

The second seeding polymer (P2) is preferably prepared by emulsion polymerization, which consists in making use of water, vinyl chloride, alone or in combination with one or more copolymerizable monomer(s), a water-soluble initiator and an anionic emulsifier, optionally in combination with a non-ionic emulsifier.

The reaction mixture is heated under autogenous pressure and moderate stirring at a temperature of between 30 and 65° C. After fall in pressure, the reaction is halted and the unconverted monomer or monomers are degassed.

The water-soluble initiators necessary for the preparation of the second seeding polymer (P2) are generally represented by hydrogen peroxide or alkali metal or ammonium persulphates, optionally in combination with water-soluble reducing agents, such as alkali metal sulphites or bisulphites. The highly variable amounts used depend on the initiator system chosen and are just sufficient to provide for the polymerization within reasonable times.

The reducing agents can be chosen from alkyl hydrogen phosphates, lactones, ketones, carbazones, alkali metal metabisulphites and mono- or polycarboxylic acids, such as ascorbic acid and its derivatives. The amount of reducing agent used is preferably between 30 and 120 ppm with respect to the monomer(s) involved. Ascorbic acid is advantageously chosen.

In the process according to the present invention, the rate of polymerization is accelerated by the action of the water-soluble metal salt and of the reducing agent on the organosoluble initiator. The metal salt is employed in an amount such that the metal salt/initiator molar ratio is preferably between 0.001 and 0.1 and more particularly between 0.001 and 0.03. The metal is generally chosen from iron, copper, cobalt, nickel, zinc, tin, titanium, vanadium, manganese, chromium and silver. Copper is advantegeously chosen.

The presence of the anionic emulsifier, optionally in combination with at least one non-ionic emulsifier, improves the stability of the microsuspension. The emulsifier or emulsifiers can be added to the reaction mixture before and/or after and/or during polymerization. The anionic emulsifiers are preferably chosen from alkaline alkyl phosphates, alkyl sulphosuccinates, allylsulphonates, vinylsulphonates, alkylarysulphonates, alkylsulphonates, ethoxylated alkyl sulphates, alkyl sulphates or fatty acid soaps. The preferred non-ionic emulsifiers are polycondensates of ethylene or propylene oxide with various hydroxylated organic compounds.

The total amount of emulsifier employed is preferably between 1 and 3% by weight of the monomer or monomers involved.

The amount of water necessary for the polymerization according to the invention is such that the initial concentration of seeding polymers, plus the monomer or monomers involved, is between 20 and 80% and preferably between 45 and 75% by weight with respect to the reaction mixture.

The seeded polymerization temperature is generally between 30 and 80° C. and the duration of polymerization is between 30 minutes and 12 hours and preferably between 1 and 8 hours.

Another method for the preparation of the latex in accordance with the present invention consists in using a first seeding polymer (P1), the particles of which contain at least 2.5% by weight of one or of several of organosoluble initiator(s). In this case, the mean diameter of the polymer particles can be less than 0.6 µm.

In addition, the seeded polymerization according to the first or second preparation method can be carried out in the presence of one or of several water-soluble initiator(s) chosen from hydrogen peroxide and alkali metal or ammonium persulphate. Ammonium persulphate is advantageously chosen.

The water-soluble initiator or initiators is or are preferably introduced into the reaction mixture before the beginning of the seeded polymerization. The amount of water-soluble initiator(s) used is preferably between 10 and 100 ppm with respect to the monomer(s) involved.

According to a third preparation method, the latex of the present invention can be obtained by mixing a latex (L1) containing a single population of particles of polymers based on vinyl chloride, the mean diameter of which is between 1.2 and 2 µm, with a second latex (L2) also containing a single population of particles of polymers based on vinyl chloride, the mean diameter of which is between 0.15 and 0.3 µm, in proportions such that the ratio by mass of polymers of the latex (L2) to those of the latex (L1) is between 0.1 and 0.3.

The latex (L1) can be obtained by seeded microsuspension polymerization according to the first two methods described above, except that the polymerization is carried out in the absence of the second seeding polymer (P2).

The latex (L2) can be obtained by emulsion polymerization of vinyl chloride, alone or in combination with one or more copolymerizable monomer(s), a water-soluble initiator and an anionic emulsifier, optionally in combination with a non-ionic emulsifier.

According to the first two preparation methods, the amount of two seeding polymers used is such that the ratio of mass of the second seeding polymer (P2) to (P1) is preferably between 0.5 and 2.

Whatever the preparation method used, the latices thus prepared are then advantageously dried by atomization to give powders which are particularly suitable for the preparation of fluid plastisols which are stable on storage.

The temperature at the atomizer inlet is preferably between 150 and 240° C. and that at the outlet is preferably between 50 and 90° C.

Experimental Part (A) Preparation of the Seeding Polymer (P1)

The following are successively introduced into an 800 liter reactor stirred at 35 revolutions/min and adjusted to 15° C.:

375 kg of water 5 l of the buffer solution containing 426 g of potassium dihydrogenphosphate and 117 g of pure sodium hydroxide 11 g of paraquinone powder 6 kg of lauroyl peroxide 320 kg of vinyl chloride 48 kg of a 10% by weight aqueous sodium dodecylbenzene sulphonate solution, the reactor being placed under vacuum just before the introduction of the vinyl chloride.

A fine dispersion of the vinyl chloride in the aqueous mixture is then produced at a temperature of less than or equal to 35° C. by stirring the said mixture for 105 minutes at 5500 revolutions/min.

The reaction mixture is then brought to the targeted polymerization temperature of 45° C. under autogenous pressure, the rate of stirring being 30 revolutions/min. During the polymerization, paraquinone is introduced continuously with a constant throughput of 10.5 g/h.

After the fall in pressure to a value of 3.5 bars, that is to say after 8 hours, the unreacted vinyl chloride is degassed. A latex is thus obtained, in which the particles have a mean diameter of approximately 0.55 µm and contain approximately 1.8% by weight of lauroyl peroxide with respect to the polymer. The concentration of the latex is 39%.

(B) Preparation of the Seeding Polymer (P1)

The preparation is carried out as described in (A), except that 11 kg of lauroyl peroxide are used. A latex is thus obtained, in which the particles have a mean diameter of approximately 0.57 µm and contain approximately 3% by weight of lauroyl peroxide with respect to the polymer. The concentration of the latex is 34%.

(C) Preparation of the Seeding Polymer (P1)

The preparation is carried out as described in (A), except that the duration for production of the fine dispersion of the vinyl chloride in the aqueous mixture is 40 minutes. A latex is obtained, in which the particles have a mean diameter of approximately 0.83 µm and contain approximately 2.1% by weight of lauroyl peroxide with respect to the polymer. The concentration of the latex is 34%.

(D) Preparation of the Seeding Polymer (P2)

The following are introduced into an 800 liter reactor equipped with a stirrer:

440 kg of water 44 g of ethylenediaminetetraacetic acid (EDTA)

10.5 g of iron sulphate 98 g of sodium formaldehydesulphoxylate 1.23 kg of lauric acid and 750 g of 50% sodium hydroxide The reactor is then placed under vacuum before the introduction of 350 kg of vinyl chloride. The reaction mixture is then brought to the targeted temperature of 55° C. As soon as the mixture reaches 52° C., and aqueous solution containing 200 g of potassium persulphate per 50 liters of water is introduced continuously. One hour after the beginning of introduction of the latter, 50 liters of aqueous solution containing 3.85 kg of [lacuna] dodecylbenzene sulphonate are added continuously at a constant throughput for 4 hours.

When the internal pressure is 4 bars, the reactor is re-exposed to air and then cooled and the unreacted vinyl chloride is removed by degassing. A latex is thus obtained in which the particles have a mean diameter of 0.13 $\mu$m.

(E) Preparation of the Seeding Polymer (L2)

The preparation is carried out as described in (D), except that the amount of lauric acid used is 527 g. A latex is obtained in which the particles have a mean diameter of 0.215 $\mu$m.

(F) Preparation of the Seeding Polymer (L2)

The preparation is carried out as described in (D), except that the amount of lauric acid used is 280 g. A latex is obtained in which the particles have a mean diameter of 0.316 $\mu$m.

Example 1

The following are successively introduced, by suction, into an 800 liter reactor equipped with a stirrer and placed under vacuum beforehand:

400 kg of demineralized water 80 g of potassium dihydrogenphosphate 3.1 g of copper sulphate ($CuSO_4.5H_2O$)

18 kg, on a dry basis, of the seeding polymer (P1) latex prepared according to (A)

11.68 kg, on a dry basis, of the seeding polymer (P2) latex prepared according to (D).

The reactor at room temperature, with stirring and containing the aqueous mixture, is again placed under vacuum. 400 kg of vinyl chloride are then introduced and then the reaction mixture is brought to the targeted temperature of 53° C. As soon as the temperature of the mixture reaches 49° C., an aqueous ascorbic acid solution is introduced continuously, followed, after one hour, by an aqueous sodium dodecylbenzene sulphonate solution.

When the pressure of the mixture is 4 bars, i.e. after polymerizing for 5 hours, the introduction of the aqueous solutions and the heating are halted and the reactor is cooled.

The total amount of ascorbic acid and of sodium dodecylbenzene sulphonate introduced is 26 g and 3.2 kg respectively.

A latex is obtained in which the polymer concentration is 50%. Particle size analysis shows that the polymer is formed of two populations, the particles of which have mean diameters of 0.206 $\mu$m and 1.05 $\mu$m respectively. The fine particles represent 14.8% by weight of the polymer.

Example 2

The reaction is carried out as described in Example 1, except that 8.4 kg, on a dry basis, of the seeding polymer (P1) latex prepared according to (B) and 14 kg, on a dry basis, of the seeding polymer (P2) latex prepared according to (D) are used. The duration of polymerization is 7 hours and the amount of ascorbic acid introduced is 42 g.

Example 3

The reaction is carried out as described in Example 2, except that 6 g of ammonium persulphate are added thereto before the beginning of polymerization.

Example 4

The reaction is carried out as described in Example 3, except that 9 g of ammonium persulphate and 10 kg, on a dry basis, of the seeding polymer (P2) latex prepared according to (D) are used.

The bipopulated latices thus obtained (Examples 1 to 4) are then dried in a Niro atomizer and then milled. The atomization and milling conditions are given below:

Inlet temperature of the atomizer=180° C.

Outlet temperature of the atomizer=60° C.

Feed throughput of the mill=320 kg/h

Speed of the mill=4800 revolutions/min

Speed of the selector=3000 revolutions/min 100 parts of the resulting powder are then mixed with 40 parts by weight of dioctyl phthalate to give a plastisol, the rheological characteristics of which, measured using a rotational rheometer of Brookfield RTV type (rotor No. 6, 20 revolutions/min, measurement and conditioning at 25° C.) and using an extrusion rheometer of Severs type (conditioning 2 h at 25° C.), are reported in Table 1.

The stability on storage of the plastisols obtained from the powders resulting from the atomization of the latices prepared according to Examples 1 to 4 is reported in Table 2. In the case of plastisols stabilized with barium and zinc salts, the formulation used is as follows: 100 parts by weight of powder, 40 parts of dioctyl phthalate, 5 parts of a coplasticizer Texamol TX1B, 30 parts of epoxidized soybean oil and 2 parts of Ackros LXBZ 112.

The formulation of the plastisols stabilized with tin salts is as follows: 100 parts by weight of powder, 40 parts of a plasticizer Santizer S 213, 5 parts of Texamol TX1B and 1.5 parts of 5 MTX 262 GV from Ciba.

TABLE 1

| Example | Concentration of the latex (%) | Size of the particles ($\mu$m) | | Level of fine particles (%) | Brookfield viscosity (poises) | | Severs throughput (g/s) | | | |
|---|---|---|---|---|---|---|---|---|---|---|
| | | | | | 1/2 H | 24 H | 1 bar | 4 bars | 8 bars | 12 bars |
| 1 | 50 | 1.05 | 0.206 | 14.8 | 150 | 290 | 0.6 | 1.4 | 2.4 | 3.8 |
| 2 | 43 | 1.37 | 0.168 | 6.4 | 130 | 170 | 0.4 | 1.0 | 2.3 | 4.4 |
| 3 | 48 | 1.29 | 0.192 | 9.3 | 140 | 230 | 0.7 | 2 | 4.4 | 7.8 |
| 4 | 47 | 1.28 | 0.208 | 14 | 120 | 150 | 0.5 | 1.6 | 3.5 | 6.4 |
| 5 | 46 | 1.18 | 0.2 | 20 | 720 | 640 | | | | |

TABLE 1-continued

| Example | Concentration of the latex (%) | Size of the particles (μm) | | Level of fine particles (%) | Brookfield viscosity (poises) | | Severs throughput (g/s) | | | |
|---|---|---|---|---|---|---|---|---|---|---|
| | | | | | 1/2 H | 24 H | 1 bar | 4 bars | 8 bars | 12 bars |
| 6 | 44 | 1.6 | 0.16 | 18.5 | 320 | 580 | | | | |
| 7 | 44 | 1.75 | 0.16 | 13 | 180 | 490 | | | | |

TABLE 2

| | Ba/Zn FORMULATION | | | | | | | | | | Sn FORMULATION | | |
|---|---|---|---|---|---|---|---|---|---|---|---|---|---|
| | BROOKFIELD VISCOSITY AT 23° C. (POISES) | | | | | BROOKFIELD VISCOSITY at 35' C. (POISES) | | | | | BROOKFIELD VISCOSITY at 23° C. (poises) | | |
| | 1/2 H | 4 H | 24 H | 48 H | 5 days | 1/2 H | 4 H | 24 H | 48 H | 5 days | 1 H | 4 H | 24 H |
| 1 | 25 | 25 | 30 | 35 | 50 | 22.5 | 30 | 127.5 | 235 | 410 | 45 | 50 | 65 |
| 2 | 20 | 20 | 20 | 20 | 22.5 | 17.5 | 17.5 | 37.5 | 62.5 | 170 | 32.5 | 32.5 | 35 |
| 3 | 20 | 20 | 22.5 | 22.5 | 27.5 | 17.5 | 20 | 65 | 105 | 265 | 35 | 35 | 40 |
| 4 | 20 | 20 | 20 | 20 | 25 | 17.5 | 17.5 | 57.5 | 100 | 210 | 30 | 30 | 35 |

Example 5

The following are successively introduced, by suction, into a 28 liter reactor equipped with a stirrer and placed under vacuum beforehand:

10 kg of demineralized water
1.5 g of potassium dihydrogenphosphate
56 mg of copper sulphate ($CuSO_4 \cdot 5H_2O$)
315 g, on a dry basis, of the seeding polymer (P1) latex prepared according to (A)
204 g, on a dry basis, of the seeding polymer (P2) latex prepared according to (D).

The reactor at room temperature, with stirring and containing the aqueous mixture, is again placed under vacuum. 7.5 kg of vinyl chloride are then introduced and then the reaction mixture is brought to the targeted temperature of 53° C. As soon as the temperature of the mixture reaches 49° C., an aqueous ascorbic acid solution is introduced continuously, followed, after one hour, by an aqueous sodium dodecylbenzene sulphonate solution.

When the pressure of the mixture is 4 bars, i.e. after polymerizing for 5 hours, the introduction of the aqueous solutions and the heating are halted and the reactor is cooled.

The total amount of ascorbic acid and of sodium dodecylbenzene sulphonate introduced is 0.8 g and 60 g respectively.

A latex is obtained in which the polymer concentration is 46%. Particle size analysis shows that the polymer is formed of two populations, the particles of which have mean diameters of 0.2 μm and 1.18 μm respectively. The fine particles represent 20% by weight of the polymer.

Example 6

The following are successively introduced into a 28 liter reactor stirred at 80 revolutions/min and adjusted to 25° C.:

10 kg of demineralized water
1.5 g of potassium dihydrogenphosphate
56 mg of copper sulphate ($CuSO_4 \cdot 5H_2O$)
225 g, on a dry basis, of the seeding polymer (P1) latex prepared according to (C)
270 g, on a dry basis, of the seeding polymer (P2) latex prepared according to (D).

The reactor containing the aqueous mixture is again placed under vacuum. 7.5 kg of vinyl chloride are then introduced and then the reaction mixture is brought to the targeted temperature of 54° C. As soon as the temperature of the mixture reaches 49° C., an aqueous ascorbic acid solution with a concentration of 0.75 g/l is introduced continuously, followed, after one and a half hours, by an aqueous sodium dodecylbenzene sulphonate solution.

When the fall in the pressure of the mixture is 1 bar, the introduction of the aqueous solutions is halted and the reactor is returned to atmospheric pressure. Heating is then halted and the reactor is rapidly cooled.

The total amount of ascorbic acid and of sodium dodecylbenzene sulphonate is 0.39 g and 112 g respectively.

Example 7

The reaction is carried out as described in Example 6, except that 277.5 g, on a dry basis, of the seeding polymer (P2) latex prepared according to (D) are used.

The latices obtained according to Examples 5 to 7 are then dried in an atomizer (inlet temperature=180° C.; outlet temperature=70° C.) and the dried resins are then milled. On conclusion of the milling, 100 parts of the resulting powder are mixed with 40 parts of dioctyl phthalate to give a plastisol, the rheological properties of which are reported in Table 1.

Example 8

Preparation of the Latex (L1)

The following are successively introduced, by suction, into a 28 liter reactor equipped with a stirrer and placed under vacuum beforehand:

9500 g of demineralized water
1.4 g of potassium dihydrogenphosphate dissolved in 20 ml of water
52.3 mg of $CuSO_4 \cdot 5H_2O$ dissolved in 20 ml of water and 600 g of the seeding polymer (P1) prepared according to (C).

The reactor at room temperature, with stirring and containing the aqueous mixture, is again placed under vacuum. 7000 g of vinyl chloride are then introduced and the mixture is then heated to the targeted temperature of 53° C. As soon as the temperature of the reaction mixture reaches 49° C., one liter of an aqueous solution containing 0.7 g of ascorbic acid is introduced continuously and then, after one hour, one liter of an aqueous solution containing 56 g of [lacuna] dodecylbenzene sulphonate and 175 mg of sodium hydroxide is introduced continuously. When the pressure of the mixture reaches 4 bars, i.e. after polymerizing for 8 hours, the introduction of aqueous solution is halted. The reactor is then placed under atmospheric pressure and then subjected to rapid cooling.

The concentration of the polymer in the aqueous mixture is 41% and the mean diameter of the particles is 1.2 μm. The degree of conversion of the vinyl chloride is 97%.

Preparation of the Mixture

A portion of the latex (L1) thus prepared is then withdrawn and is mixed with a portion of the latex (L2), prepared according to (E), in proportions such that the ratio by mass of the polymer of the latex (L2) to that of the latex (L1) is equal to 0.25.

Example 12

The reaction is carried out as described in Example 10, except that the latex (L1) used for the mixture is prepared according to (F).

Example 13

The reaction is carried out as described in Example 10, except that the mixture is prepared in proportions such that the ratio by mass of the polymer of the latex (L2) to that of the latex (L1) is equal to 0.11.

Preparation of the Plastisols

The bipopulated latices obtained by mixing (Examples 8 to 13) are atomized by using an inlet temperature of the atomizer of 180° C. and an outlet temperature of 70° C. On conclusion of this stage, the resin is then milled and then 100 parts of the resulting powder are mixed with 40 parts of dioctyl phthalate to give a plastisol, the rheological properties of which are reported in Table 3. The measurements were carried out under the same conditions as those of the plastisols of Table 1.

TABLE 3

| Example | Size of the particles (μm) | | Level of fine particles (%) | BROOKFIELD viscosity (poises) | | SEVERS throughput (g/s) | | | |
|---|---|---|---|---|---|---|---|---|---|
| | LARGE | FINE | | 1/2 H | 24 H | 1 bar | 4 bars | 8 bars | 12 bars |
| 8 | 1.2 | 0.215 | 20 | 305 | 385 | 0.26 | 0.78 | 1.54 | 2.5 |
| 9 | 1.26 | 0.215 | 20 | 230 | 400 | 0.24 | 0.68 | 1.28 | 1.9 |
| 10 | 1.35 | 0.215 | 20 | 180 | 265 | 0.30 | 0.72 | 1.32 | 2.24 |
| 11 | 1.46 | 0.215 | 20 | 165 | 190 | 0.22 | 0.54 | 1.08 | 2.28 |
| 12 | 1.35 | 0.336 | 20 | 170 | 325 | 0.26 | 0.46 | 0.62 | 0.88 |
| 13 | 1.35 | 0.215 | 10 | 145 | 260 | 0.25 | 0.28 | 0.36 | 0.58 |

Example 9

The reaction is carried out as described in Example 8, except that 525 g of the seeding polymer (P1) prepared according to (C) are used. The total amount of dodecylbenzene sulphonate introduced is 70 g.

The latex (L1) thus prepared is composed of polymer particles where the mean diameter of the particles is 1.26 μm.

Example 10

The reaction is carried out as described in Example 8, except that 450 g of seeding polymer (P1) prepared according to (C) are used. The total amount of dodecylbenzene sulphonate introduced is 85 g.

The latex (L1) thus prepared is composed of polymer particles where the mean diameter of the particles is 1.35 μm.

Example 11

The reaction is carried out as described in Example 8, except that 375 g of seeding polymer (P1) prepared according to (C) are used. The total amount of dodecylbenzene sulphonate introduced is 100 g.

The latex (L1) thus prepared is composed of polymer particles where the mean diameter of the particles is 1.46 μm.

The preceding examples can be repeated with similar success by substituting the generically or specifically described reactants and/or operating conditions of this invention for those used in the preceding examples.

The entire disclosure of all applications, patents and publications, cited above and below, and of corresponding French application No. 96/10493, are hereby incorporated by reference.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A process for producing a latex containing two populations of particles of homo- or copolymer of vinyl chloride, which comprises polymerizing, under microsuspension conditions, the corresponding monomer or monomers in the presence of a first seeding polymer (P1), the particles of which contain at least one organosoluble initiator, of a second seeding polymer (P2), the particles of which have a mean diameter less than that of the particles of the first seeding polymer (P1), of water, of an anionic emulsifier, of a soluble metal salt and of a reducing agent, is characterized in that the organosoluble initiator or initiators represent(s) at least 2.5% by weight with respect to the particles of the first seeding polymer (P1).

2. A process for producing a latex containing two populations of particles of homo- or copolymer of vinyl chloride, which comprises polymerizing the corresponding monomer or monomers under microsuspension conditions, wherein the reaction is carried out in the presence of at least one water-soluble initiator, of a first seeding polymer (P1), the particles of which contain at least one organosoluble initiator, of a second seeding polymer (P2), the particles of which have a mean diameter less than that of the particles of the first seeding polymer (P1), of water, of an anionic emulsifier, of a soluble metal salt and of a reducing agent, wherein the mean diameter of the particles of the first seeding polymer is between 0.6 and 0.9 µm.

3. A process according to claim 2, wherein the water-soluble initiator is ammonium persulphate.

4. A process according to claim 2, wherein the amount of water-soluble initiator introduced is between 10 and 100 ppm with respect to the weight of the monomer or monomers involved.

5. A process according to claim 2, wherein the ratio by weight of the second seeding polymer to the first seeding polymer is between 0.5 and 2.

6. A latex prepared by a method of claim 2 containing two populations of particles of homo- or copolymers of vinyl chloride, respectively exhibiting mean diameters of between 1.2 and 2 µm and between 0.15 and 0.3 µm, in proportions such that the ratio by weight of the population with the lesser mean diameter to that with the greater mean diameter is between 0.1 and 0.3.

7. A process for producing a latex containing two populations of particles of homo- or copolymer of vinyl chloride, comprising mixing a latex (L1) monopopulated with particles of polymers based on vinyl chloride, the mean diameter of which is between 1.2 and 2 µm, wherein the latex (L1) is formed by polymerizing monomer or monomers, under seeded microsuspension conditions, in the presence of a seeding polymer (P1), the particles of which contain at least one organosoluble initiator and have a mean diameter of between 0.6 and 0.9 µm, of water, of an anionic emulsifier, of a soluble metal salt and of a reducing agent, and a latex (L2) monopopulated with particles of polymers based on vinyl chloride, the mean diameter of which is between 0.15 and 0.3 µm, in proportions such that the ratio by mass of the polymers of the latex (L2) to those of the latex (L1) is between 0.1 and 0.3.

8. A process for producing a latex containing two populations of particles of homo- or copolymer of vinyl chloride, which comprises polymerizing, under microsuspension conditions wherein the reaction is carried out in the presence of at least one water-soluble initiator, the corresponding monomer or monomers in the presence of a first seeding polymer (P1), the particles of which contain at least one organosoluble initiator, of a second seeding polymer (P2), the particles of which have a mean diameter less than that of the particles of the first seeding polymer (P1), of water, of an anionic emulsifier, of a soluble metal salt and of a reducing agent, wherein the organosoluble initiator or initiators represent(s) at least 2.5% by weight with respect to the particles of the first seeding polymer (P1).

9. A process for producing latex (L1) according to claim 7, characterized in that the corresponding monomer or monomers is or are polymerized, under seeded microsuspension conditions, in the presence of a seeding polymer (P1), the particles of which contain at least 2.5% by weight of at least one organosoluble initiator, of water, of an anionic emulsifier, of a soluble metal salt and of a reducing agent.

10. A process according to claim 7, characterized in that the reaction is carried out in the presence of a water-soluble initiator.

* * * * *